US009247309B2

(12) United States Patent
Oztaskent et al.

(10) Patent No.: US 9,247,309 B2
(45) Date of Patent: Jan. 26, 2016

(54) METHODS, SYSTEMS, AND MEDIA FOR PRESENTING MOBILE CONTENT CORRESPONDING TO MEDIA CONTENT

(71) Applicant: Google Inc., Mountain View, CA (US)

(72) Inventors: Ant Oztaskent, London (GB); Yaroslav Volovich, Cambridge (GB); David Singleton, London (GB); Timbo Drayson, London (GB)

(73) Assignee: Google Inc., Mountain View, CA (US)

( * ) Notice: Subject to any disclaimer, the term of this patent is extended or adjusted under 35 U.S.C. 154(b) by 104 days.

(21) Appl. No.: 13/827,413

(22) Filed: Mar. 14, 2013

(65) Prior Publication Data

US 2014/0282660 A1     Sep. 18, 2014

(51) Int. Cl.
*H04N 21/482* (2011.01)
*H04N 21/4722* (2011.01)
*H04N 21/414* (2011.01)
*H04N 21/439* (2011.01)
*H04N 21/44* (2011.01)
*H04N 21/472* (2011.01)
*H04N 21/4725* (2011.01)
*H04N 21/658* (2011.01)
(Continued)

(52) U.S. Cl.
CPC ..... *H04N 21/4828* (2013.01); *H04N 21/41407* (2013.01); *H04N 21/4394* (2013.01); *H04N 21/44008* (2013.01); *H04N 21/4722* (2013.01); *H04N 21/4725* (2013.01); *H04N 21/6582* (2013.01); *H04N 21/8133* (2013.01); *H04N 21/47217* (2013.01)

(58) Field of Classification Search
CPC .......... H04N 21/4728; H04N 21/4828; H04N 21/4722; H04N 21/41407; H04N 21/4394; H04N 21/8133; H04N 21/4725; H04N 21/6582; H04N 21/44008; H04N 21/47217
USPC ........................................ 725/9–21
See application file for complete search history.

(56) References Cited

U.S. PATENT DOCUMENTS 7,840,980 B2 * 11/2010 Gutta ............................... 725/46
8,064,516 B2   11/2011 Kojokaro et al.
(Continued)

FOREIGN PATENT DOCUMENTS

WO    WO 2012014130       2/2012

OTHER PUBLICATIONS

U.S. Appl. No. 13/594,693, filed Aug. 24, 2012.
(Continued)

*Primary Examiner* — Randy Flynn
(74) *Attorney, Agent, or Firm* — Byrne Poh LLP

(57) ABSTRACT

Methods, systems, and media for presenting mobile content corresponding to media content are provided. In some implementations, a method for providing information relating to media content is provided, the method comprising: determining a channel that is providing the television program; causing images relating to the television program to be presented, wherein the images are selected based on the channel and a time parameter; receiving a user selection of an image; identifying an entity within the selected image using one or more image recognition techniques; generating a search query based at least in part on the identified entity; obtaining search results responsive to the generated search query; and causing at least one of the search results to be presented to the mobile device in response to receiving the user selection of the image.

27 Claims, 6 Drawing Sheets

(51) Int. Cl.
*H04N 21/81* (2011.01)
*H04H 60/32* (2008.01)

(56) References Cited

U.S. PATENT DOCUMENTS

| | | | |
|---|---|---|---|
| 8,185,543 B1* | 5/2012 | Choudhry et al. | 707/767 |
| 8,205,223 B2* | 6/2012 | Pack et al. | 725/18 |
| 8,392,951 B2* | 3/2013 | Park et al. | 725/60 |
| 8,694,533 B2 | 4/2014 | Oztaskent et al. | |
| 8,929,657 B2 | 1/2015 | Jung | |
| 2004/0104926 A1 | 6/2004 | Murray et al. | |
| 2006/0129908 A1 | 6/2006 | Markel | |
| 2007/0124756 A1* | 5/2007 | Covell et al. | 725/18 |
| 2007/0136773 A1 | 6/2007 | O'Neil et al. | |
| 2008/0098432 A1* | 4/2008 | Hardacker et al. | 725/51 |
| 2008/0226119 A1* | 9/2008 | Candelore et al. | 382/100 |
| 2008/0229363 A1 | 9/2008 | Lanfermann et al. | |
| 2009/0276805 A1 | 11/2009 | Andrews et al. | |
| 2010/0082585 A1 | 4/2010 | Barsook et al. | |
| 2010/0121973 A1 | 5/2010 | Lobacheva et al. | |
| 2010/0287053 A1 | 11/2010 | Ganong et al. | |
| 2011/0103763 A1 | 5/2011 | Tse et al. | |
| 2011/0125735 A1* | 5/2011 | Petrou | 707/723 |
| 2011/0243449 A1 | 10/2011 | Hannuksela et al. | |
| 2011/0282906 A1 | 11/2011 | Wong | |
| 2012/0167144 A1 | 6/2012 | Avison-Fell | |
| 2012/0227074 A1* | 9/2012 | Hill et al. | 725/61 |
| 2012/0266197 A1 | 10/2012 | Andrews et al. | |
| 2012/0311623 A1* | 12/2012 | Davis et al. | 725/18 |
| 2012/0311641 A1* | 12/2012 | Allard | 725/60 |
| 2013/0036442 A1* | 2/2013 | Wingert | 725/60 |
| 2013/0047178 A1 | 2/2013 | Moon et al. | |
| 2013/0058522 A1 | 3/2013 | Raesig et al. | |
| 2013/0104172 A1* | 4/2013 | Lee et al. | 725/60 |
| 2013/0111514 A1* | 5/2013 | Slavin et al. | 725/18 |
| 2013/0174195 A1 | 7/2013 | Witenstein-Weaver | |
| 2013/0179436 A1* | 7/2013 | Yun et al. | 707/722 |
| 2014/0253472 A1 | 9/2014 | Ayoub et al. | |
| 2014/0255003 A1 | 9/2014 | Abramson | |
| 2015/0193433 A1 | 7/2015 | Dykeman et al. | |

OTHER PUBLICATIONS

"Pharos Demonstration—Audiovisual Tunable Search—part C", Jan. 16, 2010, available at: http://www.youtube.com/watch?v=ZpxyNi6.

International Search Report and Written Opinion dated Jul. 24, 2014 in International Patent Application No. PCT/US2014/024627.

International Search Report and Written Opinion dated Jul. 28, 2014 in International Patent Application No. PCT/US2014/024255.

Office Action dated Mar. 23, 2015 in U.S. Appl. No. 13/801,843.

Office Action dated Apr. 24, 2014 in U.S. Appl. No. 13/801,843.

Notice of Allowance dated Aug. 17, 2015 in U.S. Appl. No. 13/801,843.

* cited by examiner

METHODS, SYSTEMS, AND MEDIA FOR PRESENTING MOBILE CONTENT CORRESPONDING TO MEDIA CONTENT

TECHNICAL FIELD

The disclosed subject matter relates to methods, systems, and media for presenting mobile content corresponding to media content.

BACKGROUND

While watching a television program, a viewer is often interested in information relating to the television program. For example, the viewer may want to search for additional information about an actor seen in a movie or about locations that are shown in a documentary.

Search engines allow the viewer to search on the Internet for resources, which include webpages, images, video content, and audio content. A typical search engine provides a web page for entering search terms, where the search terms are inputted by the viewer. Search results conducted for particular search terms are provided to the viewer. Moreover, with the advent of mobile devices, the use of mobile search engines has increased. For example, using a mobile device, the viewer may perform a search and browse through Internet content while watching the television program.

Text-based search engines, however, may be somewhat limited for this user. In an example where the user wants to learn the name of a particular actor in a movie and obtain additional information about the particular actor, the user may attempt to obtain this information by finding the name of the movie (e.g., from a program guide, from an online television guidance website, from a printed guide, etc.) and searching for the movie by inputting it into a mobile search engine. The user then clicks through search results to find a webpage containing information relating to the movie (e.g., an online website containing information relating to movies and television programs), accesses the webpage, and searches through the webpage to find information relating to the particular actor. If the user is able to find the actor on the webpage, the user accesses another page on the website relating to the particular actor and scans through this page to find the desired information about the particular actor. This is a time consuming procedure for the user. Moreover, this may cause the user to miss a substantial portion of the television program or to pause the television program to obtain such information via this procedure.

Accordingly, mechanisms for presenting mobile content corresponding to media content are desirable.

SUMMARY

Methods, systems, and media for presenting mobile content corresponding to media content are provided.

In accordance with some implementations of the disclosed subject matter, a method for providing information relating to media content is provided, the method comprising: determining, using a hardware processor, a channel that is providing a television program; causing, using the hardware processor, a plurality of images relating to the television program to be presented, wherein the plurality of images are selected based on the channel and a time parameter; receiving, using the hardware processor, a user selection of an image from the plurality of images; identifying, using the hardware processor, an entity within the selected image using one or more image recognition techniques; generating, using the hardware processor, a search query based at least in part on the identified entity; obtaining, using the hardware processor, a plurality of search results responsive to the generated search query; and causing, using the hardware processor, at least one of the plurality of search results to be presented to the mobile device in response to receiving the user selection of the image.

In accordance with some implementations of the disclosed subject matter, a system for providing information relating to media content is provided, the system comprising: a hardware processor that is configured to: determine a channel that is providing a television program; cause a plurality of images relating to the television program to be presented, wherein the plurality of images are selected based on the channel and a time parameter; receive a user selection of an image from the plurality of images; identify an entity within the selected image using one or more image recognition techniques; generate a search query based at least in part on the identified entity; obtain a plurality of search results responsive to the generated search query; and cause at least one of the plurality of search results to be presented to the mobile device in response to receiving the user selection of the image.

In accordance with some implementations of the disclosed subject matter, a non-transitory computer-readable medium containing computer executable instructions that, when executed by a processor, cause the processor to perform a method for providing information relating to media content is provided. The method comprising: determining a channel that is providing a television program; causing a plurality of images relating to the television program to be presented, wherein the plurality of images are selected based on the channel and a time parameter; receiving a user selection of an image from the plurality of images; identifying an entity within the selected image using one or more image recognition techniques; generating a search query based at least in part on the identified entity; obtaining a plurality of search results responsive to the generated search query; and causing at least one of the plurality of search results to be presented to the mobile device in response to receiving the user selection of the image.

In accordance with some implementations of the disclosed subject matter, a system for providing information relating to media content is provided. The system comprising: means for determining a channel that is providing a television program; means for causing a plurality of images relating to the television program to be presented, wherein the plurality of images are selected based on the channel and a time parameter; means for receiving a user selection of an image from the plurality of images; means for identifying an entity within the selected image using one or more image recognition techniques; means for generating a search query based at least in part on the identified entity; means for obtaining a plurality of search results responsive to the generated search query; and means for causing at least one of the plurality of search results to be presented to the mobile device in response to receiving the user selection of the image.

In some implementations, the system further comprises means for receiving audio data corresponding to a television program from a mobile device, wherein the channel is determined based on the received audio data.

In some implementations, the system further comprises means for obtaining an audio fingerprint of the audio data.

In some implementations, the system further comprises means for generating the audio fingerprint from the received audio data.

In some implementations, the system further comprises: means for extracting an audio stream from each of a plurality of television channels; means for generating, for each of the plurality of television channels, at least one audio fingerprint from at least a portion of the extracted audio stream that corresponds to one of the plurality of television channels; and means for storing the at least one audio fingerprint in a database indexed by channel.

In some implementations, the system further comprises: means for comparing the audio fingerprint with the at least one stored audio fingerprint; and means for identifying the television program based on the comparison.

In some implementations, the system further comprises: means for extracting a plurality of programming images from each of a plurality of television channels; and means for storing the plurality of programming image in a database indexed by channel and time.

In some implementations, the system further comprises means for using the determined channel and the time parameter to obtain the plurality of images, wherein the plurality of images are a subset of the plurality of extracted programming images.

In some implementations, the system further comprises: means for receiving a second user selection of a region of interest within the selected image; and means for identifying the entity within the region of interest using the one or more image recognition techniques.

In some implementations, the system further comprises: means for detecting a plurality of faces within the selected image using a facial recognition technique; means for prompting the mobile device to select a face from the plurality of detected faces; and means for identifying the entity associated with the selected face.

In some implementations, the system further comprises: means for accessing guidance data to determine the television program based on the determined channel and the timing parameter; means for receiving program information relating to the television program; and means for identifying the entity within the selected image using the received program information.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements

DETAILED DESCRIPTION

Figure 1:
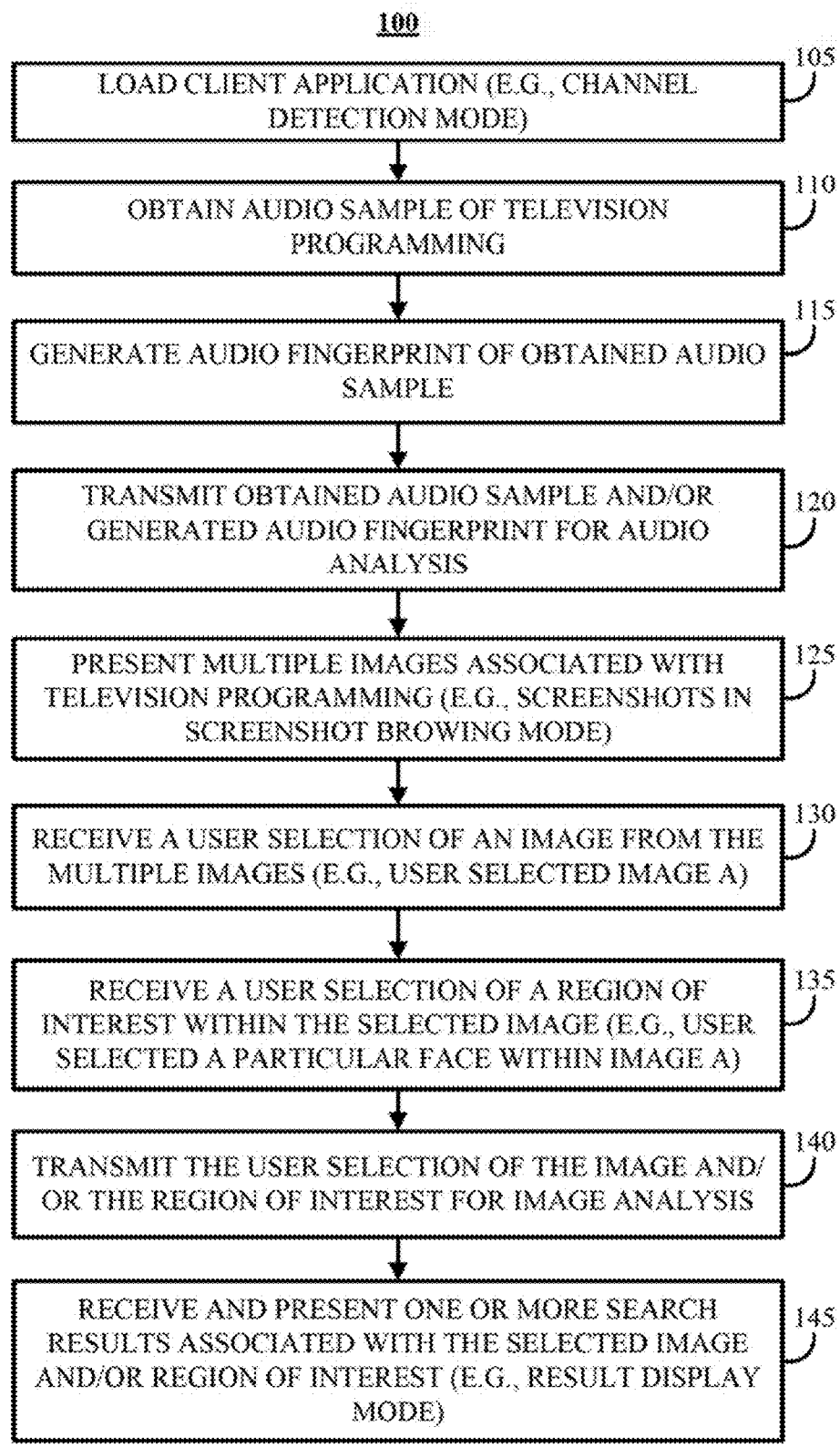
FIG. 1 shows an illustrative example of a process for presenting search results based on media content in accordance with some implementations of the disclosed subject matter.

In accordance with some implementations of the disclosed subject matter, mechanisms for presenting mobile content corresponding to media content are provided.

In some implementations, these mechanisms can receive audio data or any other suitable media data relating to one or more programs. For example, in response to launching a client application on a mobile device, these mechanisms can enter a channel detection mode that includes activating an audio input device (e.g., a microphone) and capturing audio data corresponding to a television program currently being presented on a display device. In a more particular example, an audio fingerprint or any other suitable digital representation can be generated from the received audio data, where the audio fingerprint can be used to identify the same or similar portions of audio data.

In response to receiving the audio data, the mechanisms can identify the channel that is providing the television program. For example, upon receiving the audio data and/or the audio fingerprint, the mechanisms can compare the audio data against other stored representations (e.g., other audio fingerprints, other audio data, etc.) to identify the channel.

It should be noted that, in some implementations, audio data may not be captured. For example, the channel detection mode can include identifying the channel by using the client application to detect the channel that a media playback device (which is connected to the mobile device) is currently tuned to. In another example, when the mobile device includes a transmitter for transmitting codes, such as infrared codes or code sequences, to a media playback device, the channel detection mode can include identifying the channel by determining the last channel that the user of the mobile device selected. In this example, when the mobile device and the user input device (e.g., a remote control) are connected via a communications network, the channel detection mode can include identifying the channel by transmitting a query to the user input device for the last channel that the user selected. In yet another example, the client application can present the user of the mobile device with a list of channels for selection. In this example, the client application can allow the user of the mobile device to indicate a particular channel that the user is watching on a media playback device (which may or may not be connected to the mobile device).

Using the channel information associated with the audio data or any other suitable program information, the mechanisms can obtain multiple images relating to the program. For example, these mechanisms can enter a screenshot browsing mode that includes accessing a database of images (e.g., screenshots of programming content) and obtaining multiple images corresponding to the identified channel and a time parameter (e.g., the last N minutes). The images can then be transmitted back to the client application executing on the mobile device for review and selection by a user of the client application. In this example, the client application can present the user with multiple images that include scenes presented by the channel within a particular time period.

In response to receiving a user selection of one of the images, the mechanisms can generate a search query. For example, in response to receiving the selected image, these mechanisms can enter a result display mode that includes identifying an entity in the selected image (e.g., a person, a location, a landmark, an object, etc.) and generating a search query based at least in part on the identified entity. In a more particular example, the mechanisms can identify one or more entities within the selected image using one or more image recognition techniques (e.g., image recognition, optical character recognition, facial recognition, etc.). In another more particular example, the mechanisms can receive a region of interest within the selected image and one or more entities can be identified within the region of interest. The region of interest can include, for example, a user-defined region that includes a particular face, a particular landmark, etc.

Upon generating the search query, the mechanisms can perform a search to obtain search results responsive to the search query that contains the identified entity. The search results can include, for example, uniform resource locators (URLs) associated with webpages responsive to the terms in the search query. In some implementations, the mechanisms can select at least one of the search results to transmit to the client application for presenting to the user. In some implementations, the mechanisms can transmit all of the search results to the client application for presenting to the user. Alternatively, the mechanisms can automatically open the page associated with the selected search result (e.g., the top search result) on a suitable web browsing application executing on the mobile device. It should be noted that any suitable content can be provided to the mobile device, such as an answer that includes entity information, summarized entity information, a set of links corresponding to the identified entity, news information corresponding to the identified entity, etc.

It should be noted that, although the implementations described herein generally relate to providing mobile content corresponding to a television program, this is merely illustrative. While the television program can be live, broadcasted media content, the mechanisms can be implemented to provide mobile content corresponding to recorded content, over-the-top content, etc.

These mechanisms can be used in a variety of applications. For example, these mechanisms can be used to provide a mobile device user with the opportunity to interact with media content presented on a display device. In another example, these mechanisms can be used to provide a mobile device user with additional information associated with presented media content without entering a text-based search query into a search engine. In yet another example, screenshots and then entity-related information can be automatically presented to a user in response to launching a client application implementing the mechanisms described herein.

Turning to FIG. 1, an illustrative example 100 of a process for presenting search results based on media content is shown in accordance with some implementations of the disclosed subject matter. At 105, a computing device can load a client application that presents search results based on media content. The computing device can be a mobile device (e.g., a cellular telephone, a smartphone, a tablet computing device, a wearable computing device, etc.).

It should be noted that the media content can include one or more programs from various sources, such as programs broadcast over-the-air, programs broadcast by a cable television provider, programs broadcast by a telephone television provider, programs broadcast by a satellite television provider, on-demand programs, over-the-top programs, Internet content, streaming programs, recorded programs, etc.

At 110, once the client application is loaded, the client application can enter a channel detection mode, which can begin by obtaining an audio sample of the television programming currently being presented. For example, the client application can activate an audio input device coupled to the computing device, such as a microphone, where the audio input device captures and records the audio sample or any other suitable audio data associated with a presented television program. In another example, the client application can receive a user indication to store audio data for transmission to an audio matching service.

In some implementations, the client application can activate an audio input device that captures audio from its surroundings and uses appropriates filters and/or other audio enhancements to extract an audio fingerprint or filtered audio data associated with the presented television program. For example, silent portions of the audio sample can be removed to reduce the file size of the audio sample. In another example, portions of the audio sample having distortion can be removed to reduce the file size of the audio sample. In yet another example, in response to determining that at least a portion of the audio sample does not include audio data having a given quality, the client application can prompt the user of the client application to record another audio sample.

In some implementations, the client application executing on the computing device can generate an audio fingerprint of the audio sample using any suitable audio fingerprinting technique at 215. The audio fingerprint can be a digital representation generated from the received audio sample, where the audio fingerprint can be used to identify the same or similar portions of audio data. Alternatively, the client application can transmit the audio sample associated with the television program to a search system that generates an audio fingerprint.

At 120, the client application can transmit the obtained audio sample and/or the audio fingerprint for analysis. For example, upon launching the client application and activating the audio input device, the client application can automatically stream the audio sample and/or the audio fingerprint to a search system that accesses a matching service (e.g., an audio fingerprint match service). As described above, the client application can stream the audio sample to a search system, where the search system generates an audio fingerprint corresponding to the audio sample and transmits the audio fingerprint to an audio fingerprint match service for analysis.

In some implementations, additional information can be transmitted along with the audio sample, such as client device information, user profile information, location information, user preferences, timing information, and other information that can be used to generate a search query associated with the audio sample of the television program.

It should be noted that in implementations described herein in which the client application (or other mechanisms described herein) collects information about a particular user, the user can be provided with an opportunity to control whether the client application collects information about particular users and/or how collected user information is used by the client application. Examples of information about a user can include the user's interests and identifying information of the user (e.g., a user profile, user credentials, device identification, etc.). Additionally, certain information about the user can be stored locally (e.g., not shared), encrypted, and/or treated in one or more ways before it is stored to remove personally identifiable information. For example, the client application can store user preferences and/or user interests for a particular user with an anonymous user identifier (e.g., a user identifier that is not associated with the user's name, the user's username and/or password, the user's email address, etc.). Using these techniques, the user can have control over what information is collected about the user and/or how that information is used by the client application.

Figure 2:
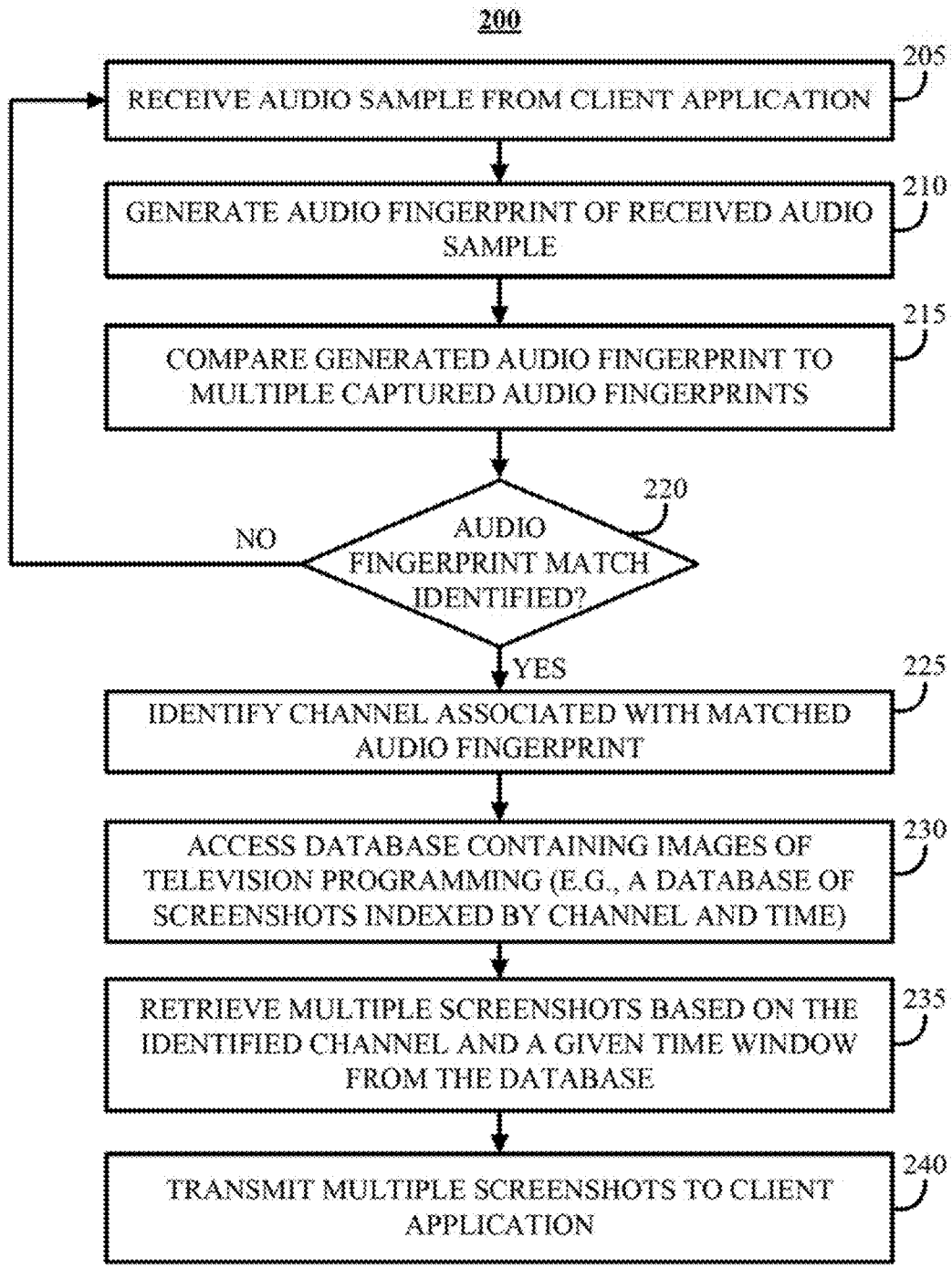
FIG. 2 shows an illustrative example of a process for determining a channel and other program information based on audio data and transmitting screenshots associated with the audio data in accordance with some implementations of the disclosed subject matter.

Turning to FIG. 2, upon receiving the audio sample and/or other additional information from the client application at 205, an audio fingerprint of the received audio sample can be generated at 210. Again, the audio fingerprint can be generated by the client application or any other suitable application and transmitted to the search system for analysis.

At 215, the search system can compare the generated audio fingerprint to multiple audio fingerprints. For example, the generated audio fingerprint associated with the audio sample from the client application can be compared against a subset of stored audio fingerprints. In a more particular example, the search system can access a database or other suitable storage device containing multiple audio fingerprints and filter the multiple audio fingerprints to a subset of audio fingerprints based on location information, user preferences, and other information received from the client application. In this example, only audio fingerprints associated with the received location information can be used to compare with the generated audio fingerprint. In another example, particular audio fingerprints from the database or storage device can be used for comparison before others, such as audio fingerprints associated with popular channels, newer audio fingerprints, audio fingerprints commonly matched, etc.

In some implementations, the search system can, for example, include capture modules that receive and process signals from multiple sources (e.g., multiple channels). These capture modules can, for each channel, capture video screenshots at particular time intervals (e.g., every two or three seconds) and/or generate audio fingerprints from audio data at particular time intervals. Generally speaking, these capture modules can monitor media content from multiple content sources and generate video screenshots, audio fingerprints, and/or any other suitable content identifier. More particularly, these capture modules can store the generated video screenshots, audio fingerprints, and other content identifiers in a storage device. For example, a capture module can monitor channels providing broadcast television content and store generated audio fingerprints in a database that is indexed by channel and time.

It should be noted that, in some implementations, generated video screenshots, audio fingerprints, and other content identifiers indexed by channel and time in a database can be discarded after a predetermined time. For example, in response to determining that a video screenshot is associated with a time outside of a particular time window, the search system or any other suitable component can remove the video screenshot from the database.

At 220, it can be determined whether a match is found. If no matching audio fingerprint is found, the search system can return to 205 and wait to receive additional audio samples from the client application. Additionally or alternatively, the search system can transmit a message to the client application requesting that the user restart the client application, transmit another audio sample, and/or input or verify particular information (e.g., program information, such as channel number, service provider information, program title, etc.).

In response to identifying an audio fingerprint match at 220, the search system can identify a channel or any other suitable content identifier associated with the matched audio fingerprint. For example, the matching audio fingerprint can be associated with a channel (e.g., Channel X) and the search system uses the association to determine that the user of client application is watching a television program provided on that channel. In another example, the search system can transmit a notification to the client application that the channel has been identified. This notification can include, for example, an indication that the search system has successfully identified the channel from the received audio sample and/or the identified channel.

It should be noted that, in some implementations, the client application can initiate the channel detection mode without capturing audio information or using audio fingerprints (e.g., steps 110-120 of FIG. 1 and steps 205-220 of FIG. 2).

In some implementations, the search system can include identifying a channel by detecting the channel that a media playback device (which is connected to the mobile device) is currently tuned to. For example, the search system can transmit a query to the mobile device to determine which devices are connected to the mobile device. In response to determining that a media playback device, such as a television device or a set-top box, is connected to the mobile device, the search system can instruct the client application to communicate with the media playback device to determine the channel that the media playback device is currently tuned to. Alternatively, in response to determining that a user input device, such as a remote control, is connected to the mobile device, the search system can instruct the client application to communicate with the user input device to determine the last channel or previous channels that have been tuned to.

In a more particular example, the client application executing on the mobile device can include a second screen application or can communicate with a second screen application that has been installed on the mobile device. Second screen applications can, for example, allow the user of the mobile device or other second screen device to be presented with content transmitted to a media playback device, such as a television device or a set-top box. The client application can use the second screen application to determine the channel that the media playback device is presenting on the second screen device.

In another more particular example, the client application executing on the mobile can include a remote control application or can communicate with a remote control application that has been installed on the mobile device. Remote control applications can, for example, allow the mobile device to issue a command to control the media playback device (e.g., channel up, channel down, etc.) and, in response, instruct an infrared transmitter connected to the mobile device to transmit a corresponding infrared code to the media playback device. The client application can use the remote control application to determine the last channel or previous channels that have been tuned to.

In some implementations, the client application can present the user of the mobile device with a list of channels for selection. In this example, the search system can receive a particular channel or any other suitable content identifier that the user is currently watching on a media playback device (which may or may not be connected to the mobile device).

In some implementations, the client application can enter a screenshot browsing mode, which can begin by transmitting a request for images corresponding to the identified channel at 230. For example, the client application can automatically transmit a request to the search system for images, such as video screenshots, for the identified channel and for a particular time interval (e.g., screenshots from the last N minutes provided by the identified channel). As described above, the search system can include one or more databases or other suitable storage device that include stored video screenshots and other images captured from media content provided by multiple sources.

In response, the search system can retrieve multiple screenshots or other images from the accessed database based on the identified channel and a given time interval at 235. For example, the search system can receive multiple screenshots corresponding to five minutes of programming provided on a particular channel.

At 240, the multiple screenshots and other images can be transmitted to the client application for presenting to the user.

Referring back to FIG. 1, the multiple images associated with the television program can be presented to the user at 125. For example, the client application can allow the user to scroll through different images (e.g., screenshots), where the user can scroll vertically or horizontally on the computing device. In another example, the client application can provide the user with all of the multiple images, where the user can pan and zoom in on particular images.

In response to receiving and presenting the multiple images to the user, the client application can prompt the user to select an image from the multiple images at 130. For example, the client application can detect when the user has placed a highlight region over an image and pressed a suitable button on the computing device. In another example, when the computing device is a mobile device with a touch screen, the client application can respond to contact with the touch screen, such as one or more taps on the touch screen, movement of the point of contact while maintaining continuous contact, etc.

In some implementations, in response to receiving a user selection of an image at 130, the client application can prompt the user to select a region of interest within the selected image at 135. For example, when the computing device is a mobile device with a touch screen, the client application can request that the user provide one or more taps on a specific region of interest within the selected image. In a more particular example, the client application can analyze the selected image and divide the select images into one or more subsections (e.g., based on identified objects).

In a more particular implementation, the client application can detect one or more faces within the selected image using a facial recognition technique. In response, the client application can provide the user with the opportunity to select one of the detected faces. For example, the user can select the face of an actor of interest within a selected image. The selected face can be used for further image analysis and query generation. Additionally or alternatively, the client application can detect one or more objects within the selected image using an object recognition technique. This can include identifying items, landmarks, and/or location within the selected image. Similarly, the client application can provide the user with the opportunity to select one of the detected objects, which can be used for further image analysis and query generation.

At 140, the client application can enter a result display mode that transmits the user selections, which can include a selected image, a selected region of interest, a selected face, a selected object, and/or any other suitable portion of an image, to the search server.

Figure 3:
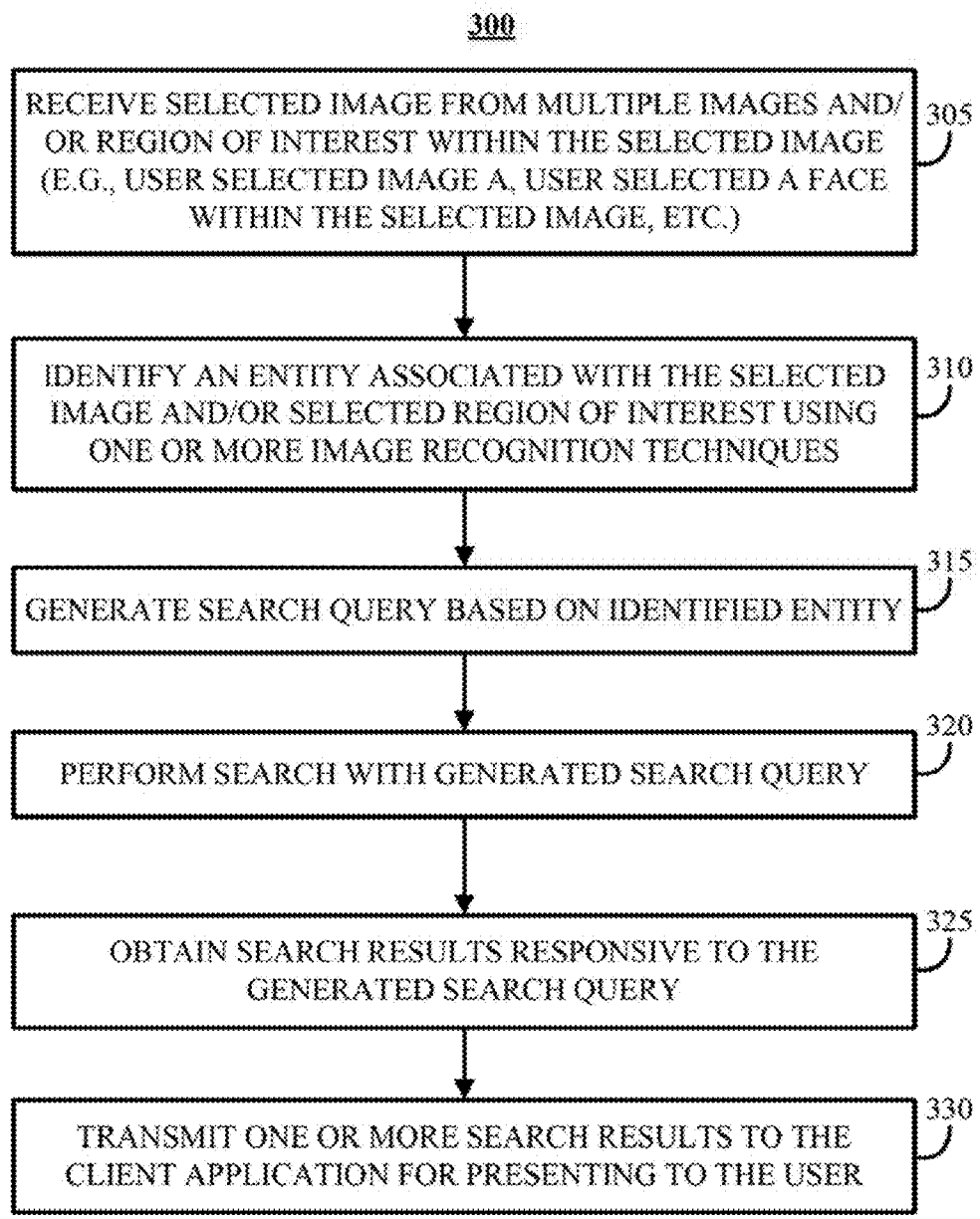
FIG. 3 shows an illustrative example of a process for generating a search query that contains an entity identified from an image selected by a user of the client application in accordance with some implementations of the disclosed subject matter.

Turning to FIG. 3, in response to receiving the selected image and/or any other suitable portion of the image at 305, the search system can identify an entity within the selected image using one or more image recognition techniques. For example, entities can include people, places, events, objects, creatures, logos, characteristics, features, or any other suitable entity related to the television program. These entities can be associated with the television program in various ways. For example, an image of a person or a landmark can be included in a video signal associated with the program.

In one particular example, entities associated with the television program can be identified based on facial recognition techniques to identify people, such as actors and actresses, included in the selected image associated with the program. In another example, entities associated with the television program can be identified based on image recognition techniques to identify landmarks included in the selected image associated with the program. In yet another example, entities associated with the television program can be identified based on optical character recognition techniques to identify keywords included in the selected image associated with the program.

In some implementations, the search system can obtain guidance data for providing additional information to identify the entity in the selected image. For example, the search system using guidance data, such as electronic program guide data, can obtain a list of actors, actresses, and/or cast members of a television program provided on the identified channel. Such guidance data can be provided along with the selected image, where the search system can use one or more image recognition techniques to identify an entity within the selected image. The guidance data can, for example, be used to filter false positives, thereby improving entity identification accuracy. The identified entity can be transmitted from an image recognition module back to the search system.

In some implementations, upon identifying the entity, the search system can generate a search query at 315. Such a search query can include the identified entity and/or information relating to the identified entity. For example, the search system can generate a search that includes the name of the identified entity for transmission to a search engine. In some implementations, the search query can also include content information previously obtained by the search system and/or the client application.

At 320, the search system can perform a search. In some implementations, the search system can perform the search by transmitting the generated search query to a search engine, which can then execute the search. In some implementations, the search system can use a search application programming interface (API) to search various content sources for search results responsive to the generated search query. Search results responsive to the generated search query can be obtained at 325.

In some implementations, the search system can select one or more of the search results using any suitable approach. For example, the search system can select the most popular search results (e.g., the top ranked search result), selecting the most relevant search results, etc.

Alternatively, instead of selecting one or more search results, the search system can transmit all of the search results to the client application for presentation to the user. This can allow the user to scan through the search results and select an appropriate search result for obtaining additional information on a desired entity from an image.

In some implementations, the search system can rank the search results using one or more criterion. For example, the search system can assign a weight to each of the search results, such that news-related search results are weighted higher than commerce-related search results. In another example, the search system can determine that the user of the client application has set user preferences that indicate a preference to receive news-related search results or pages from particular websites. In this example, the search system can automatically filter the search results based on such user preferences.

The one or more search results can be transmitted to the client application for presenting to the user at 330. Referring back to FIG. 1, the client application can then receive and present one or more search results associated with the selected image and/or region of interest to the user. For example, the client application can provide the user with a search result in response to selecting an image and, in turn, the user can select the search result for additional information on the identified entity in the selected image. In another example, the client application can load a page associated with the search result in a web browsing application. That is, in response to loading the client application and selecting an image of interest, the client application can provide the user with a page containing information relating to an identified entity within the selected image.

It should be noted that, in some implementations, the client application can continuously and/or periodically transmit an audio sample or any other suitable audio data relating to a television program being presented to the search system. In response, the client application can be provided with updated images for selection and, upon selecting one of the images, a search result. More particularly, search results corresponding to the updated audio sample and a recently selected image can be continuously and/or periodically returned to the client application and displayed on a graphical user interface associated with the client application (e.g., a web browsing application that loads the URL associated with the search result).

It should also be noted that, in some implementations, the client application can continue to identify the channel that the user of the client application is tuned. For example, in response to changing from one channel to another, the client application can receive an updated audio sample and identify the channel based on the updated audio sample. In another example, the client application can continue to access a second screen application or a remote control application (e.g., at predetermined times) and identify the last channel that has been tuned to.

Figure 4:
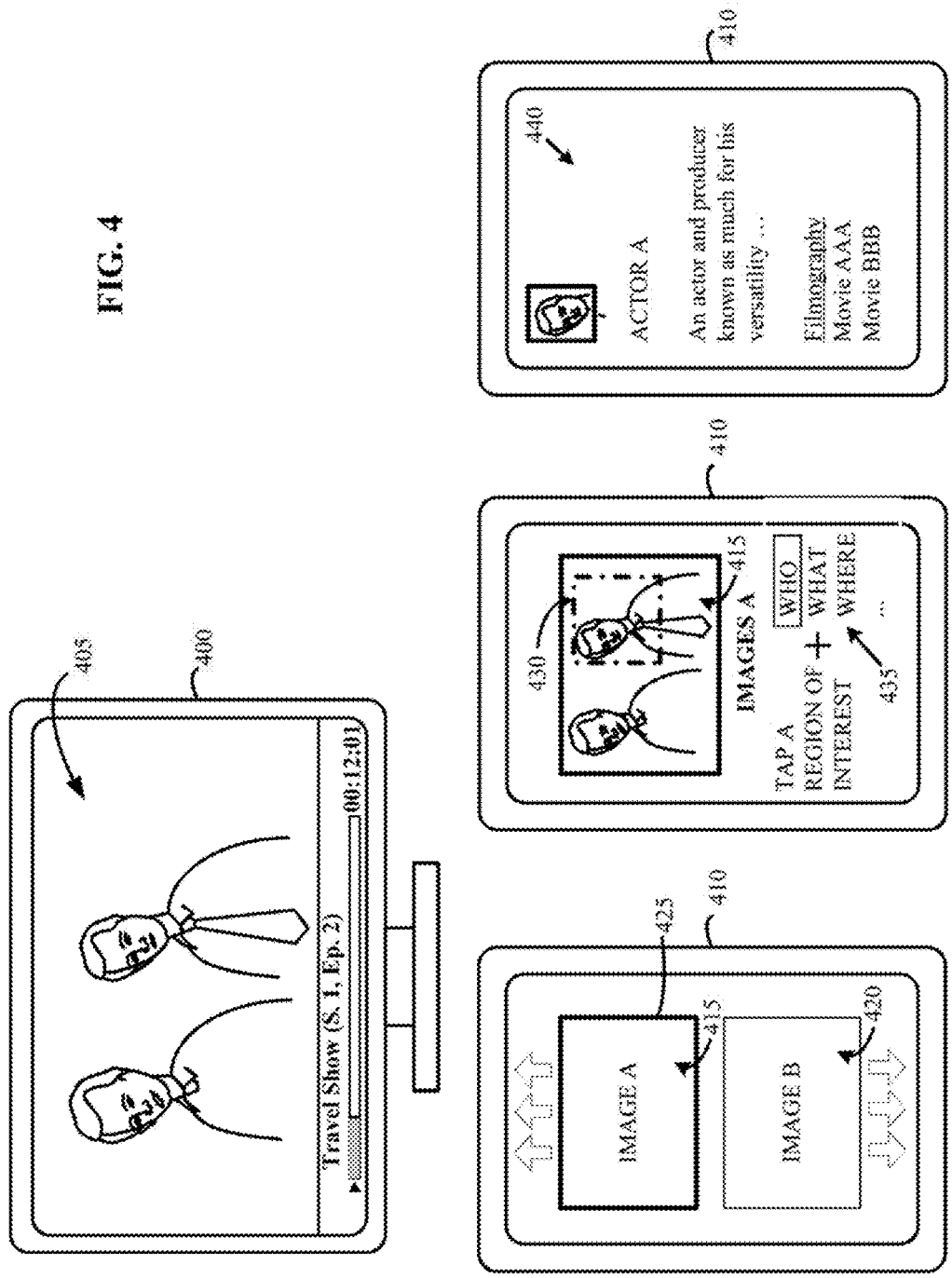
FIG. 4 shows an illustrative example of a device that is providing media content, such as a television program, and a mobile device that, upon initiation of the client application, provides multiple images relating to the television program, interfaces for selecting an image, and search results relating to an entity identified in the image in accordance with some implementations of the disclosed subject matter.

FIG. 4 shows an illustrative example of a television device 400 displaying a television program or other suitable media content and a computing device 410 displaying multiple interfaces for selecting an image, selecting a region of interest, and/or presenting content relating to the identified entity in accordance with some implementations of the disclosed subject matter. As shown, a television device 400 can display a television program 405 (or other suitable media content) on a display.

In response to transmitting an audio sample corresponding to television program 405 provided on television device 400 (e.g., a generated audio fingerprint), a computing device 410 can process the audio sample to determine the channel corresponding to the audio sample. As described above, this can include comparing a generated audio fingerprint with audio fingerprints that are generated by capturing audio data from multiple channels and that are stored in an audio fingerprint database. The matching audio fingerprint can be used to identify the channel associated with the audio sample and, in turn, the channel can be used as an identifier in a database of images (e.g., video screenshots) to retrieve multiple images relating to the television program or programs. As also described above, a channel can be identified using other suitable approaches, such as determining the last channel that has been tuned to by communicating with a second screen application or a remote control application. The channel can also be identified by prompting the user of the mobile device with a list of selectable channel identifiers and receiving a user-selected channel.

As described above, computing device 410, such as a second screen device, can be coupled to television device 400 (e.g., in communication with television device 400) or a device that is causing program 405 to be presented on television device 400, such as a set-top box or a digital media receiver. In some implementations, computing device 410 can be a stand-alone device that is not coupled to television device 400 or a device causing program 405 to be presented on television device 400 (e.g., a second screen device, such as a mobile telephone or a tablet computer, is in communication with the search server). As also described above, computing device 410 can be any computing device suitable for presenting the entity-related content or other associated content to a user, such as a smartphone, a tablet computer, a wearable computer, a heads-up display, a laptop computer, a personal computer (PC), a smart television, etc.

As shown, multiple images 415 and 420 are presented to the user on a graphical user interface associated with the client application. It should be noted that the images can be presented in any suitable manner—e.g., a scrollable list of images where images are presented one at a time, multiple images can be presented at a time based on the size of the display of computing device 410, etc. For example, when the computing device is a second screen device having a large display, such as a tablet computing device, multiple images can be presented in the graphical user interface. In another example, when the computing device is a smartphone, one image can be presented at a time and the user can be provided with an option to navigate to another image (e.g., using one or more gestures on a touch screen, pressing a suitable button on the smartphone, etc.).

In some implementations, the client application can indicate that an image from the multiple images has been selected by the user. For example, as shown in FIG. 4, a highlight region 415 can be placed around the selected image to indicate the user selection. In another example, the client application can wait for a second action to indicate a selection of the highlighted image, such as a swiping gesture on a touch screen or the user pressing a button.

In some implementations, in response to selecting an image, the client application can request that the user provide further information regarding the selected image. For example, as shown in FIG. 4, in response to selecting image 415 (e.g., a screenshot of a television program at a particular time), the client application can request that the user select a region of interest 430. For example, region of interest 430 can be a free form region drawn by the user. In another example, multiple regions can be presented by the client application upon performing an image recognition technique (e.g., faces using a facial recognition technique, objects using an object recognition technique, etc.). In these examples, the client application can request that the user select a region of interest for transmitting back to the search system along with the selected image. This can, for example, facilitate the search system in generating a search query for the desired entity (e.g., an actor, an actress, a landmark, an object, etc.).

In some implementations, the client application can also provide the user with supplemental options relating to the selected image or the selected region of interest. For example, as shown in FIG. 4, the client application can provide the user with options 435. Options 435 can request that the user select question terms for transmitting back to the search system along with the selected image and/or selected region of interest. As shown, the question terms include who (e.g., who is in the selected image), what (e.g., what is the object or landmark shown in the selected image), and where (e.g., where does this scene in the selected image take place). This can also facilitate the search system in generating a search query for the desired entity (e.g., an actor versus a landmark in the selected image).

As also shown in FIG. 4, in response to transmitting suitable information to the search system (e.g., a selected image, a selected region of interest, a question term, etc.), a search can be generated with the identified entity in the selected image and one or more search results 440 can be presented to the user. In this particular example, the search result 440 is displayed on a graphical user interface associated with the client application (e.g., a web browsing application that loads the URL associated with the search result). More particularly, in response to identifying an entity (e.g., the actor) in region of interest 430 within image 415, an actor filmography page can be automatically displayed to the user of the client application.

Figure 5:
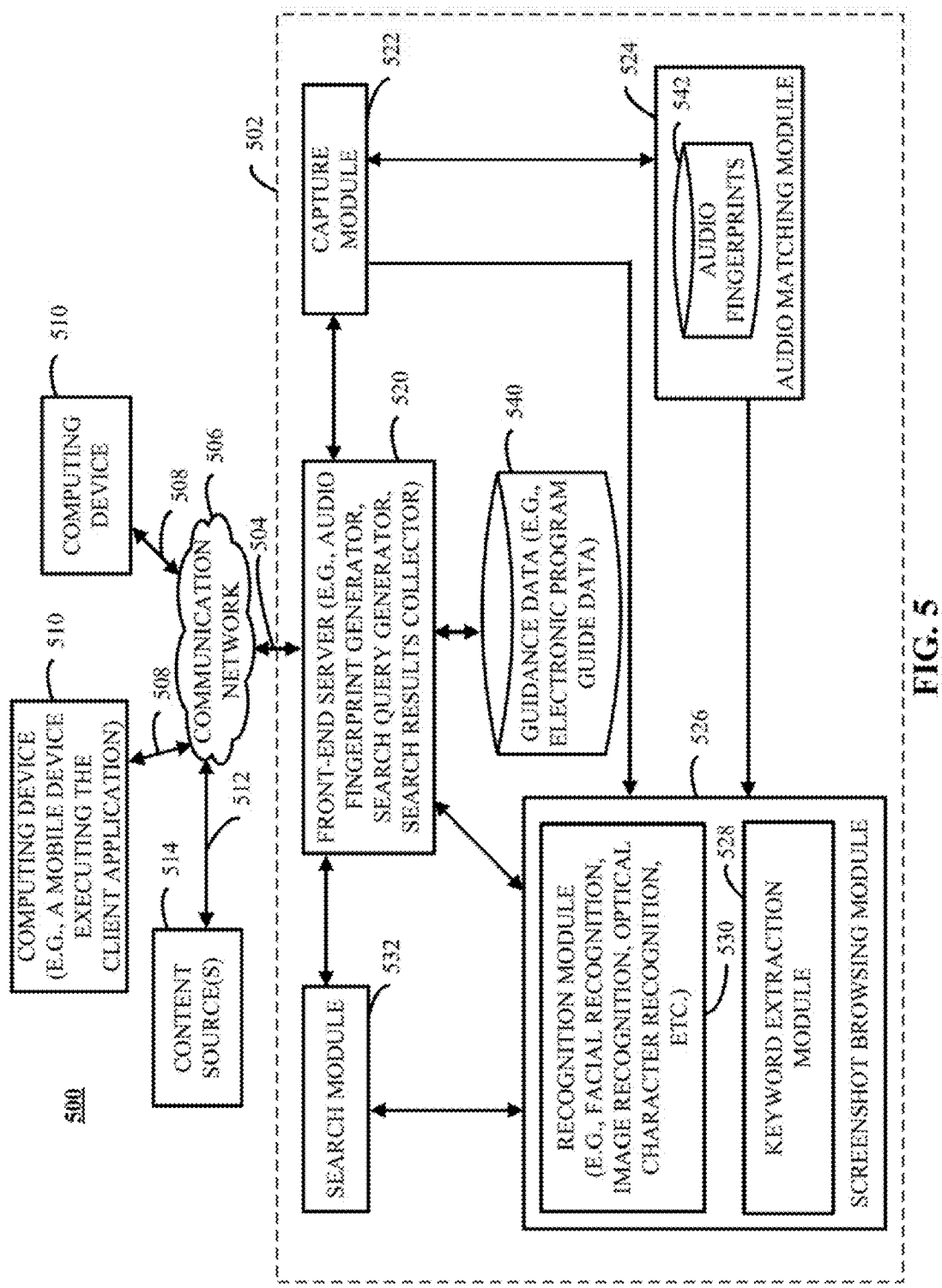
FIG. 5 shows a schematic diagram of an illustrative system suitable for implementation of the mechanisms described herein for providing content, such as search results, corresponding to media content in accordance with some implementations of the disclosed subject matter.

Turning to FIG. 5, an illustrative example 500 of a generalized schematic diagram of a system on which the mechanisms for presenting mobile content based on media content is shown in accordance with some implementations of the disclosed subject matter. As illustrated, system 500 can include one or more computing devices 510. Computing devices 510 can be connected by one or more communication links 508 to a communications network 506 that can be linked via a communications link 504 to a server 502. In some implementations, computing devices 510 and server 502 can be linked via a communications link 512 to one or more content sources 514.

System 500 can include one or more servers 502. Server 502 can be any suitable server for providing access to the searching application, such as a processor, a computer, a data processing device, or any suitable combination of such devices. For example, searching application can be distributed into multiple backend components and multiple frontend components and/or interfaces. In a more particular example, backend components, such as data collection and data distribution can be performed on one or more servers 502.

In some implementations, front-end components of the search application (or a portion of the search application), such as a user interface and/or channel identification features can be performed on one or more computing devices 510.

In some implementations, each of the computing devices 510 and server 502 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, computing device 510 can be implemented as a smartphone, a tablet computer, a wearable computer, a smart television, a set-top box, a digital media receiver, a game console, a personal computer, a laptop computer, a personal data assistant (PDA), a home entertainment system, any other suitable computing device, or any suitable combination thereof.

For example, in some implementations, a program can be presented using a first computing device 510, such as a smart television, a set-top box, a digital media receiver, etc., and supplemental content can be presented using a second computing device 510, such as a tablet computer, a smartphone, a wearable computer, a PDA, etc.

In some implementations, content source(s) 514 can be any suitable content sources, such as a cable (or telephone) television content source, a satellite television content source, an on-demand program content source, an over-the-top program content source, an Internet content source, a streaming program content source, any other suitable content source, or any suitable combination thereof.

In some implementations, communications network 506 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 504, 508 and 512 can be any communications links suitable for communicating data among computing devices 510, server 502 and/or content source(s) 514, such as network links, dial-up links, wireless links, hard-wired links, any other suitable communications links, or any suitable combination of such links. Computing devices 510 can enable use of the techniques described herein that can allow the features of the mechanisms to be used. Computing devices 510, server 502 and content source(s) 514 can be located at any suitable location.

In some implementations, server 502 can include one or more modules 520-532 and/or databases 540-542 that can be interconnected, for performing various functions of the search application and/or facilitating the mechanisms for generating and presenting search results based on media content information.

In some implementations, a front-end server module 520 can perform processes for generating interactive content as described above in connection with, for example, FIGS. 1-3. For example, the front-end server can act as a proxy between the client application executing on computing device 510 and other server modules, such as capture module 522, audio matching module 542, screenshot browsing module 526, and search module 532.

In some implementations, a capture module 522 can receive media data related to a program or a channel, such as video data, audio data, electronic program guide data, metadata, etc., as described above in connection with, for example, FIG. 1. Additionally or alternatively, capture module 522 can extract various media data from content provided from content sources as described in connection with, for example, FIG. 1. Such extracted media data can include, for example, audio fingerprints, subtitles, video screenshots, etc. This information can be stored, for example, in a database (not shown) for use by the search application executing on front-end server 520 in identifying channels, obtaining screenshots, and/or various other operations.

In some implementations, an audio matching module 524 can receive audio fingerprint data for a program from capture module 522 and compare the received audio fingerprint data against stored audio fingerprint data in a fingerprint database 542. This fingerprint database can be used, for example, to identify a channel as described above, to determine a program that is being presented to a user, etc.

In some implementations, a screenshot browsing module 526 can extract one or more images based on the identified channel. For example, based on the identified channel, screenshot browsing module 526 can retrieve images corresponding to a particular time window associated with that channel. In response to receiving a user selection of an image, screenshot browsing module 526 can use a keyword extraction module 528 or any other suitable module to extract and identify one or more entities from the image. In addition, screenshot browsing module 526 can include a recognition module 530 that is configured to perform one or more recognition techniques, such as facial recognition techniques, image recognition techniques, optical character recognition techniques, etc.

In some implementations, keyword extraction module 528 can extract entities, such as the entities described above in connection with FIG. 1. For example, keyword extraction module 528 can extract the identity of people, places, events, objects, creatures, logos, or any other suitable entity. Additionally or alternatively, keyword extraction module 528 can identify entities using recognition module 530, which can, for example, compare information from an image of a face from a video screenshot to a database of known face information (e.g., face information of known individuals) to determine an identity of a person in the image. Similarly, recognition module 530 can, for example, compare information from an image of an object, such as buildings, statutes, product packaging, electronics, fruit and vegetables, or any other suitable object to a database of known object information to determine an identity of an object in an image. As described above, any suitable recognition techniques can be used by recognition module 530 to facilitate entity identification from program related data by keyword extraction module 528 and/or screenshot browsing module 526.

In some implementations, front-end server module can access search module 532. Search module 532 can, for example, generate a search query based on the identified entity in the selected image and perform a search to obtain search results responsive to the search query. In a more particular example, an identified entity can be transmitted to search module 532, which constructs one or more search queries related to the content associated with the identified channel as well as the identified entity information. Once the relevant search query is generated, the search query can be provided to a suitable search engine, which searches one or more repositories and indexes for results responsive to the search query. In some implementations, the search engine can be a general search engine that is accessed by search module 532 using, for example, a search application programming interface (API). Alternatively, the search engine can be a search engine used exclusively by front-end server 520 or any other component of system 500.

As described above, in some implementations, the search results can be filtered and/or personalized based on the user of the client application. For example, search results can be removed and/or retained based on user search histories, previous user interaction selections, user settings, user profiles, client device types, user location, and/or other user information. The search results can be provided to front-end server 520 that generates the search results into a format appropriate for sending the results back to the client application executing on computing device 510. For example, the search results can be formatted as hypertext markup language (HTML) content that can allow a web browsing application on computing device 510 to display the search results (e.g., by loading the associated web page). In another example, the search results can be formatted such that they can be displayed within the client application executing on computing device 510. That is, in response to loading the client application and selecting an image of interest, the client application can display a search result corresponding to the media content.

In some implementations, guidance data 540, such as an electronic program guide (EPG) database, can be accessed. For example, front-end server module 520 can access guidance data 540 to obtain program information related to an identified channel or an identified program and use the program information to filter entities, search results, etc. It should be noted that, in some implementations, guidance data 540 can be provided from, for example, content source(s) 514.

It should be noted that, although modules 520-532 and databases 540-542 are shown as being included in server 502, these modules and/or databases can be provided in different servers in various combinations. For example, search module 532 can be provided on a first server and modules 520-530 can be provided on a second server. As another example, each module can be provided on a different server. It should be noted that these are merely examples, and the modules described can be organized in any suitable manner.

It should also be noted that modules 520-532 can be included as part of the search application, can each be a separate application, or can be part of any other suitable application.

Figure 6:
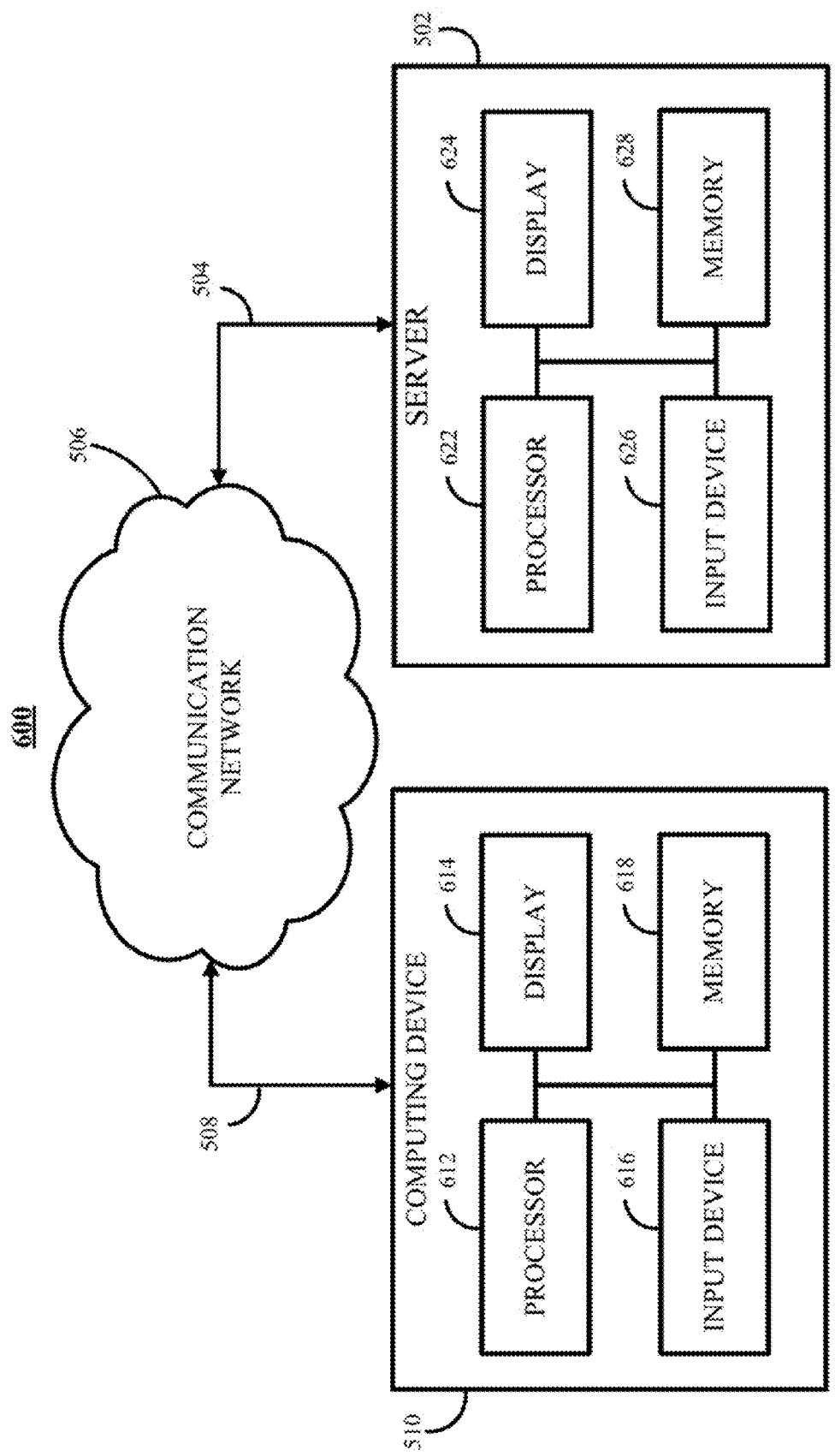
FIG. 6 shows a detailed example of a server and one of the computing devices of FIG. 5 that can be used in accordance with some implementations of the disclosed subject matter.

FIG. 6 illustrates an example 600 of hardware that can be used to implement server 502 and one of computing devices 510 depicted in FIG. 5 in accordance with some implementations of the disclosed subject matter. Referring to FIG. 6, computing device 510 can include a hardware processor 612, a display 614, an input device 616, and memory 618, which can be interconnected. In some implementations, memory 618 can include a storage device (such as a non-transitive computer-readable medium) for storing a computer program for controlling hardware processor 612.

Hardware processor 612 can use the computer program to present on display 614 content and/or an interface that allows a user to interact with the client application and to send and receive data through communications link 508. It should also be noted that data received through communications link 508 or any other communications links can be received from any suitable source. In some implementations, hardware processor 612 can send and receive data through communications link 508 or any other communication links using, for example, a transmitter, receiver, transmitter/receiver, transceiver, or any other suitable communication device. Input device 616 can be a computer keyboard, a mouse, a trackball, a keypad, a remote control, any other suitable input device, or any suitable combination thereof. Additionally or alternatively, input device 616 can include a touch screen display 614 that can receive input (e.g. using a finger, a stylus, or the like).

Server 502 can include a hardware processor 622, a display 624, an input device 626, and memory 628, which can be interconnected. In some implementations, memory 628 can include a storage device for storing data received through communications link 504 or through other links, and processor 622 can receive commands and values transmitted by one or more users of, for example, computing device 510. The storage device can further include a server program for controlling hardware processor 622.

The mechanisms described herein for providing search results and other content based on media content can be implemented in computing devices 510 and/or server 502 as software, firmware, hardware, or any suitable combination thereof.

In some implementations, server 602 can be implemented as one server or can be distributed as any suitable number of servers. For example, multiple servers 502 can be implemented in various locations to increase reliability, function of the application, and/or the speed at which the server can communicate with computing devices 510.

In some implementations, the client application can include an application program interface (not shown), and/or can be resident in memory 618 of computing device 510 and/or memory 628 of server 502. Additionally or alternatively, a graphical user interface ("GUI") can be distributed to computing device 510, which can allow a user to interact with the client application resident at, for example, server 502.

In some implementations, the application can include client-side software, server-side software, hardware, firmware, or any suitable combination thereof. For example, the application can encompass a computer program that causes one or more processors to execute the content generation application. As another example, the application(s) can encompass a computer program written in a programming language recognizable by computing device 510 and/or server 502 that is executing the application(s) (e.g., a program written in a programming language, such as, Java, C, Objective-C, C++, C#, Javascript, Visual Basic, HTML, XML, ColdFusion, any other suitable approaches, or any suitable combination thereof).

In some implementations, the application can encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Accordingly, methods, systems, and media for presenting mobile content corresponding to media content are provided.

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 1-3 can be executed or performed in any order or sequence not limited to the order and sequence shown and described in the figures. Also, some of the above steps of the processes of FIGS. 1-3 can be executed or performed substantially simultaneously where appropriate or in parallel to reduce latency and processing times.

It should also be noted that, as used herein, the term mechanism can encompass hardware, software, firmware, or any suitable combination thereof.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for providing information relating to media content, the method comprising:
   determining, using a hardware processor, a channel that is providing a television program;
   causing, using the hardware processor, a plurality of images relating to the television program to be presented by a mobile device, wherein the plurality of images are selected based on the channel and a time parameter;
   receiving, using the hardware processor, a user selection of an image from the plurality of images;
   receiving, using the hardware processor, program information relating to the television program, wherein the program information includes information about one or more people appearing in the television program;
   causing, using the hardware processor, a plurality of question terms to be presented by the mobile device;
   receiving, using the hardware processor, a user selection of a question term from the plurality of question terms, wherein the user selection of the question term indicates that an entity to be identified is a person;
   receiving a user selection of a region of interest within the selected image;
   in response to receiving the user selection of the question term and the user selection of the region of interest, identifying, using the hardware processor, a person entity within the selected region of interest using one or more facial recognition techniques based on the one or more people appearing in the television program;
   generating, using the hardware processor, a search query based at least in part on the identified person entity;
   obtaining, using the hardware processor, a plurality of search results responsive to the generated search query; and
   causing, using the hardware processor, at least one of the plurality of search results to be presented to the mobile device in response to receiving the user selection of the image.

2. The method of claim 1, further comprising receiving audio data corresponding to a television program from the mobile device, wherein the channel is determined based on the received audio data.

3. The method of claim 2, wherein receiving the audio data further comprises obtaining an audio fingerprint of the audio data.

4. The method of claim 3, further comprising:
   extracting an audio stream from each of a plurality of television channels;
   generating, for each of the plurality of television channels, at least one audio fingerprint from at least a portion of the extracted audio stream that corresponds to one of the plurality of television channels; and
   storing the at least one audio fingerprint in a database indexed by channel.

5. The method of claim 4, further comprising:
   comparing the audio fingerprint with the at least one stored audio fingerprint; and
   identifying the television program based on the comparison.

6. The method of claim 1, further comprising:
   extracting a plurality of programming images from each of a plurality of television channels; and
   storing the plurality of programming image in a database indexed by channel and time.

7. The method of claim 6, wherein the plurality of images relating to the television program are presented by using the determined channel and the time parameter to obtain the plurality of images, wherein the plurality of images are a subset of the plurality of extracted programming images.

8. The method of claim 1, further comprising:
   detecting a plurality of faces within the selected image using a facial recognition technique;
   prompting the mobile device to select a face from the plurality of detected faces; and
   identifying the entity associated with the selected face.

9. The method of claim 1, further comprising:
accessing guidance data to determine the television program based on the determined channel and the timing parameter.

10. A system for providing information relating to media content, the system comprising:
a hardware processor that is configured to:
determine a channel that is providing a television program;
cause a plurality of images relating to the television program to be presented by a mobile device, wherein the plurality of images are selected based on the channel and a time parameter;
receive a user selection of an image from the plurality of images;
receive program information relating to the television program, wherein the program information includes information about one or more people appearing in the television program;
cause a plurality of question terms to be presented by the mobile device;
receive a user selection of a question term from the plurality of question terms, wherein the user selection of the question term indicates that an entity to be identified is a person;
receive a user selection of a region of interest within the selected image;
in response to receiving the user selection of the question term and the user selection of the region of interest, identify a person entity within the selected region of interest using one or more image recognition techniques based on the one or more people appearing in the television program;
generate a search query based at least in part on the identified person entity;
obtain a plurality of search results responsive to the generated search query; and
cause at least one of the plurality of search results to be presented to a mobile device in response to receiving the user selection of the image.

11. The system of claim 10, wherein the hardware processor is further configured to receive audio data corresponding to a television program from the mobile device, wherein the channel is determined based on the received audio data.

12. The system of claim 11, wherein the hardware processor is further configured to obtain an audio fingerprint of the audio data.

13. The system of claim 12, wherein the hardware processor is further configured to:
extract an audio stream from each of a plurality of television channels;
generate, for each of the plurality of television channels, at least one audio fingerprint from at least a portion of the extracted audio stream that corresponds to one of the plurality of television channels; and
store the at least one audio fingerprint in a database indexed by channel.

14. The system of claim 13, wherein the hardware processor is further configured to:
compare the audio fingerprint with the at least one stored audio fingerprint; and
identify the television program based on the comparison.

15. The system of claim 10, wherein the hardware processor is further configured to:
extract a plurality of programming images from each of a plurality of television channels; and
store the plurality of programming image in a database indexed by channel and time.

16. The system of claim 15, wherein the hardware processor is further configured to use the determined channel and the time parameter to obtain the plurality of images, wherein the plurality of images are a subset of the plurality of extracted programming images.

17. The system of claim 10, wherein the hardware processor is further configured to:
detect a plurality of faces within the selected image using a facial recognition technique;
prompt the mobile device to select a face from the plurality of detected faces; and
identify the entity associated with the selected face.

18. The system of claim 10, wherein the hardware processor is further configured to:
access guidance data to determine the television program based on the determined channel and the timing parameter.

19. A non-transitory computer-readable medium containing computer executable instructions that, when executed by a processor, cause the processor to perform a method for providing information relating to media content, the method comprising:
determining a channel that is providing a television program;
causing a plurality of images relating to the television program to be presented by a mobile device, wherein the plurality of images are selected based on the channel and a time parameter;
receiving a user selection of an image from the plurality of images;
receiving program information relating to the television program, wherein the program information includes information about one or more people appearing in the television program;
causing a plurality of question terms to be presented by the mobile device;
receiving a user selection of a question term from the plurality of question terms, wherein the user selection of the question term indicates that an entity to be identified is a person;
receiving a user selection of a region of interest within the selected image;
in response to receiving the user selection of the question term and the user selection of the region of interest, identifying a person entity within the selected region of interest using one or more facial recognition techniques based on the one or more people appearing in the television program;
generating a search query based at least in part on the identified person entity;
obtaining a plurality of search results responsive to the generated search query; and
causing at least one of the plurality of search results to be presented to a mobile device in response to receiving the user selection of the image.

20. The non-transitory computer-readable medium of claim 19, wherein the method further comprises receiving audio data corresponding to a television program from the mobile device, wherein the channel is determined based on the received audio data.

21. The non-transitory computer-readable medium of claim 20, wherein the method further comprises obtaining an audio fingerprint of the audio data.

22. The non-transitory computer-readable medium of claim 21, wherein the method further comprises:

extracting an audio stream from each of a plurality of television channels;

generating, for each of the plurality of television channels, at least one audio fingerprint from at least a portion of the extracted audio stream that corresponds to one of the plurality of television channels; and storing the at least one audio fingerprint in a database indexed by channel.

23. The non-transitory computer-readable medium of claim 22, wherein the method further comprises:

comparing the audio fingerprint with the at least one stored audio fingerprint; and identifying the television program based on the comparison.

24. The non-transitory computer-readable medium of claim 19, wherein the method further comprises:

extracting a plurality of programming images from each of a plurality of television channels; and storing the plurality of programming image in a database indexed by channel and time.

25. The non-transitory computer-readable medium of claim 24, wherein the method further comprises using the determined channel and the time parameter to obtain the plurality of images, wherein the plurality of images are a subset of the plurality of extracted programming images.

26. The non-transitory computer-readable medium of claim 19, wherein the method further comprises:

detecting a plurality of faces within the selected image using a facial recognition technique;

prompting the mobile device to select a face from the plurality of detected faces; and identifying the entity associated with the selected face.

27. The non-transitory computer-readable medium of claim 19, wherein the method further comprises:

accessing guidance data to determine the television program based on the determined channel and the timing parameter.

* * * * *